United States Patent [19]

Claeyssen et al.

[11] Patent Number: 5,532,540
[45] Date of Patent: Jul. 2, 1996

[54] ELECTRIC MOTOR WITH VIBRATING ELEMENTS AND ELASTIC COUPLING

[75] Inventors: Frank Claeyssen, Meylan; Ronan Le Letty, Combrit; Nicolas Lhermet, Meylan, all of France

[73] Assignee: Figest B.V., Netherlands

[21] Appl. No.: 503,018

[22] Filed: Jul. 17, 1995

Related U.S. Application Data

[63] Continuation-in-part of Ser. No. 287,234, Aug. 8, 1994, abandoned.

[30] Foreign Application Priority Data

Aug. 18, 1993 [FR] France .................... 93 10085

[51] Int. Cl.⁶ ........................................ H01L 41/08
[52] U.S. Cl. ............................... 310/323; 310/328
[58] Field of Search ........................ 310/328, 323, 310/26

[56] References Cited

U.S. PATENT DOCUMENTS

| | | | |
|---|---|---|---|
| 4,339,682 | 7/1982 | Toda et al. | 310/328 X |
| 4,613,782 | 9/1986 | Mori et al. | 310/323 |
| 4,622,483 | 11/1986 | Staufenberg et al. | 310/328 X |
| 4,706,230 | 11/1987 | Inoue et al. | 310/328 X |
| 4,868,446 | 9/1989 | Kumada | 310/323 |
| 4,950,135 | 8/1990 | Tojo et al. | 310/328 X |
| 5,132,582 | 7/1992 | Hayashi et al. | 310/323 |
| 5,233,258 | 8/1993 | Muoga et al. | 310/323 |

FOREIGN PATENT DOCUMENTS 0370508  3/1993  European Pat. Off. .
1613087  10/1987  Germany .

Primary Examiner—Mark O. Budd
Attorney, Agent, or Firm—Laff, Whitesel, Conte & Saret, Ltd.

[57] ABSTRACT

The stator of the motor comprises a support structure bearing at least one pair of transducers each including a vibrating element, the transducers being located colinearly and excited so their vibrating elements vibrate at one and the same frequency, but with a phase shift of 90°, and a coupling shell to which the vibrations are applied, and at least one rotor frictionally driven by the coupling shell. The coupling shell is of closed shape and is fixed at two opposed points on its major axis to the transducers. The resonance frequency of the coupling shell is the same in both vibration modes so that high efficiency is obtained.

15 Claims, 6 Drawing Sheets

5,532,540

ELECTRIC MOTOR WITH VIBRATING ELEMENTS AND ELASTIC COUPLING

This is a continuation-in-part application based on U.S. application Ser. No. 08/287,234, filed Aug. 8, 1994 now abandoned.

FIELD OF THE INVENTION

The subject of the invention is an electric motor comprising at least one pair of transducers each comprising a vibrating element, these transducers being located colinearly in permanent contact with a support structure and excited so that their vibrating elements vibrate at one and the same frequency, depending on the alignment of the transducers, but with a phase shift of 90°, an elastic coupling means to which the vibrations of the two transducers are applied, said coupling means being an elastic component in permanent contact, at two opposed points, with the transducers, and exhibiting symmetry relative to a plane perpendicular to the line of action of the transducers, and at least one element frictionally driven by the coupling means whose zone of contact with the driven element is given a circular or elliptical movement.

PRIOR ART

It has already been proposed to produce such motors or actuators by means of piezoelectric devices. Such piezoelectric motors are described on page 470 to 473 of the chapter "Piezokeramische Vibromotoren" (piezoceramic vibromotors) of the journal "FEINGERATETECHNIK" (PRECISION MEASURING TECHNOLOGY) October 1983. This journal describes a piezoelectric actuator using two piezoelectric devices perpendicular to one another and connected by a coupling element in the form of a ball or a half-cylinder so that the coupling element is driven in a circular or elliptical movement allowing frictional driving of a motor member or, conversely, allowing it to be driven.

Applications of this motor principle are moreover described in U.S. Pat. No. 4,613,782. This patent especially describes a motor including two multi-layer piezoelectric transducers fixed colinearly to a base and a coupling structure combining the vibrations of the piezoelectric devices. This structure is made up of four connecting bars joined together and to the base by seven articulations so as to form a polygonal structure one of whose sides is formed by the base itself. The use of multi-layer piezoelectric elements makes it possible to obtain a relatively high vibrational force, but the efficiency of the motor is nevertheless relatively low because some of the excitation vibrations of the transducer are absorbed by the base. What is more, the resonant modes are indistinct and can therefore not be used, and it is difficult to control the coupling structure. Finally, the assembly exhibits certain complexity which makes it tricky and costly to produce.

An ultrasonic motor is known from the European Patent Application 0,370,508, which is made up of a transducer mounted diametrically in a coupling means made up of a cylindrical vibrator driving rotors located around the cylindrical vibrator. When the transducers is excited, the section of the vibrator deforms in an ellipse, but each material point of the vibrator moves with a reciprocating linear trajectory. Now, it is known that a linear trajectory is much less efficient than an elliptical trajectory. Furthermore, the direction of rotation of such a motor cannot be reversed. The addition of a second transducer does not change these conditions.

In U.S. Pat. No. 5,233,258 of MYOGA is described an ultrasonic sheet feeder including a convex shell to which are applied the vibrations of two piezoelectric ceramic elements having one end in contact with one of the two ends of the convex shell. Such a shell has two intrinsic vibration modes, i.e. a mode in which the convex shell is translated in the direction of the axis of the piezoelectric ceramic elements and a mode in which the convex shell is vibrated (symmetrical mode). The piezoelectric ceramic elements are driven at a resonance frequency at which the convex shell is translated. MYOGA is concious that it should be desirable to make a shell wherein the resonance frequencies of both modes are equal in order to obtain an optimal efficiency, but he means that in order to realize this equality the flexional stiffness of the convex shell must be to much reduced so that such setting is not practicable.

SUMMARY OF THE INVENTION

The object of the present invention is to make motors of the above type wherein, due to coupling pieces, the stator has the same resonance frequency in the two vibration modes and relatively a high stiffness. Resonance driving in both modes allows to considerably increase the efficiency of the motor because the excitation of the motor at the resonance frequency allows that displacements in the perpendicular and tangential directions on the surface of contact have the benefit of the effect of mechanical amplification factor Q due to resonance and related to the mechanical quality factor resulting respectively from the two vibration modes of the coupling piece. The high stiffness is an advantage permitting high forces or torques.

According to the invention the coupling shell is a shell presenting an axis of symmetry on which the transducers are aligned and able to produce, from symmetric displacements due to the transducers, displacements on points of the shell belonging to the symmetry plane perpendicular to the axis of symmetry, both perpendicular to the previous one and amplified by a factor $\alpha$ and the transducers are supported at a vibration mode by the support structure and the approximate ratio $\alpha$ between the major axis and the minor axis of the coupling shell, the motional mass $m_C$ of the ensemble of coupling shell and transducers in translation motion, the motional mass $m^*_C$ of the ensemble of coupling shell and transducers in flexion mode, the stiffness $k_A$ of the transducers from the transducers and the stiffness $k_C$ of the coupling shell considered from the transducers meet the relation, $$\alpha = ((m_C/m^*_C) \cdot (2k_A + k_C)/2k_A)^{1/2}.$$

The motional mass is the mass of the parts in motion. It is not the same in both modes.

If the above relation is met the resonance frequency of the stator made of the transducers and the coupling shell is the same in both vibration modes and the efficiency of the motor is greatly increased.

The coupling shell may have a flat or three-dimensional vibrating structure.

A closed shape, for example a ring shape provides high stiffness and high forces.

In such a motor, each point on the elastic coupling component describes an elliptical trajectory, of more or less pronounced eccentricity, and all the points on the elastic component describe an ellipse in the same sens and in phase regardless of their position on the elastic component. The direction of driving may be reversed simply by inverting the power supply of one of the transducers.

The closed shape of the coupling element, which fulfills the triple role of vibration coupling, geometric vibration converter and mechanical amplitude converter proves particularly appropriate. It is particularly able to convert amplitudes of displacement and amplitudes of force. It plays a part in the resonance of the assembly.

The transducers are of piezoelectric, magnetostriction or electrostriction type, but the transducers are preferably LANGEVIN'S transducers, that means transducers made of several piezoelectric elements assembled together and prestressed with a metallic coaxial mass. This type of transducers offer the advantage of presenting a vibration node common to both vibration modes when said vibration modes are matched together. The transducers can so advantageously be mounted on their support by means of a collar located at the vibration node.

For an elliptical shell compressed along its major axis, the amplitudes of radial displacement along its minor axis are amplified in a ratio greater than 1 fairly substantially approaching the major axis/minor axis ratio. In practice, amplification factors from 2 to 5 may be obtained. The forces are, conversely, decreased in the same ratio.

It should be noted that the amplitude conversion effect comes into play only in producing the radial component of displacement of the point of contact with the driven element. Its axial component is independent, in principle, of this effect and therefore of the shape of the shell. This observation is very important when one is concerned with obtaining satisfactory operation in resonance.

The coupling element makes it possible to easily make use of the very pronounced resonant modes which result in an elliptical movement whose horizontal and vertical axis parameters depend on the frequency of the resonant mode and may give rise to movements either of very low speed and high torque, or of very high speed and low torque. The performance of such motors is substantially improved by comparison with those of the prior motors.

The appended drawing represents, by way of example, a few embodiments of the motor according to the invention.

Figure 16:
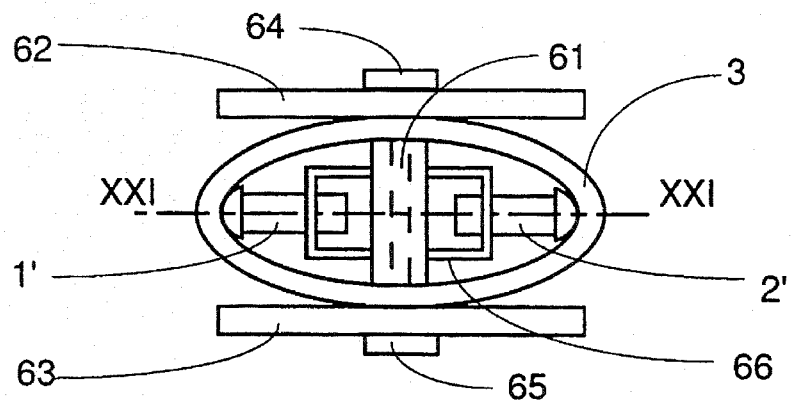

FIG. 16 diagrammatically represents a motor with two rotors with internal transducers.

Figure 17:
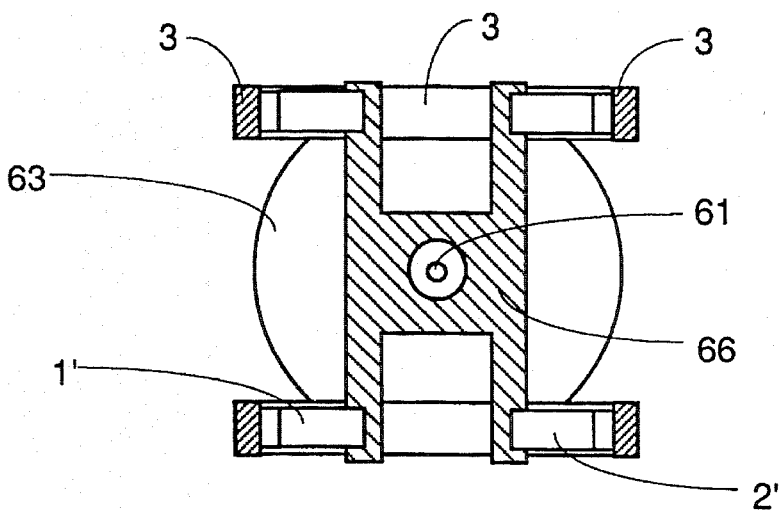
Figure 18:
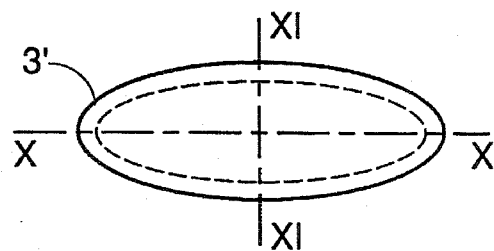

FIG. 17 is a section on XXII—XXII of FIG. 18.

FIG. 18 represents a coupling shell of ovoid shape.

Figure 19:
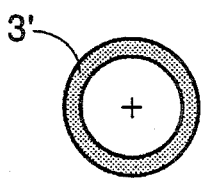

FIG. 19 is a transverse section according XI—XI of the coupling shell of FIG. 18.

Figure 20:
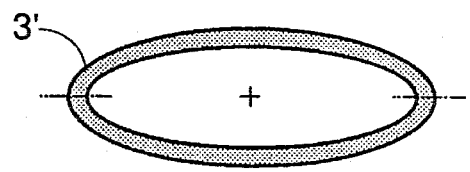

FIG. 20 is an axial section according X—X of the coupling shell of FIG. 18.

Figure 10:
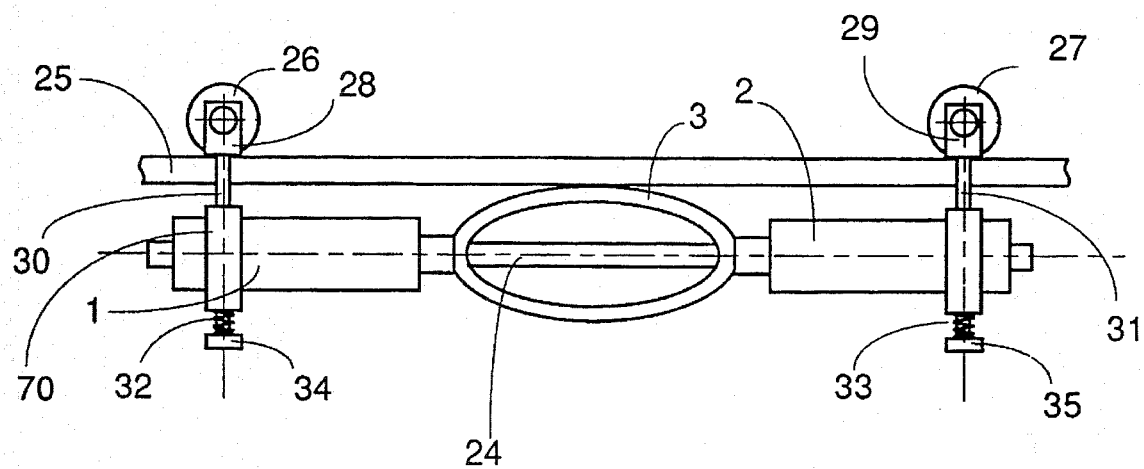
FIG. 10 represents a carriage with linear motor with external transducers.
Figure 21:
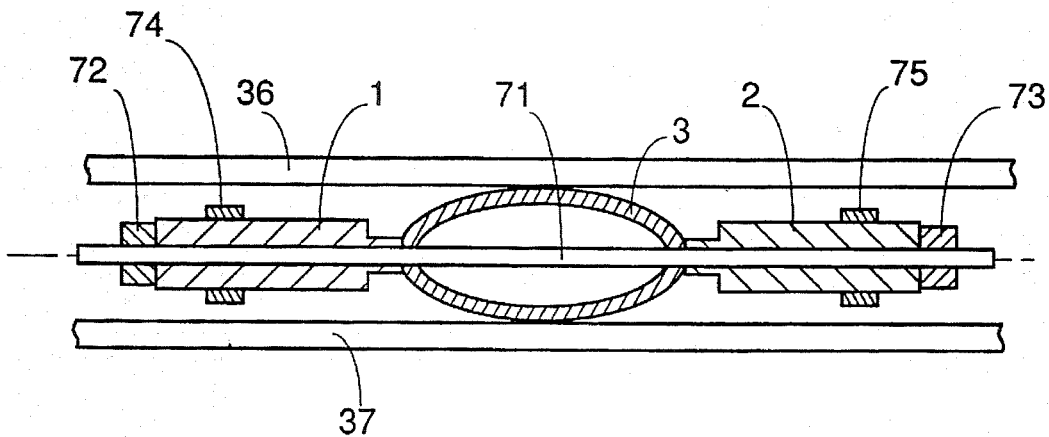

FIG. 21 is a variant of the carriage of FIG. 10 comprising a rod crossing the coupling shell.

DESCRIPTION OF THE PREFERRED EMBODIMENT

Figure 1:
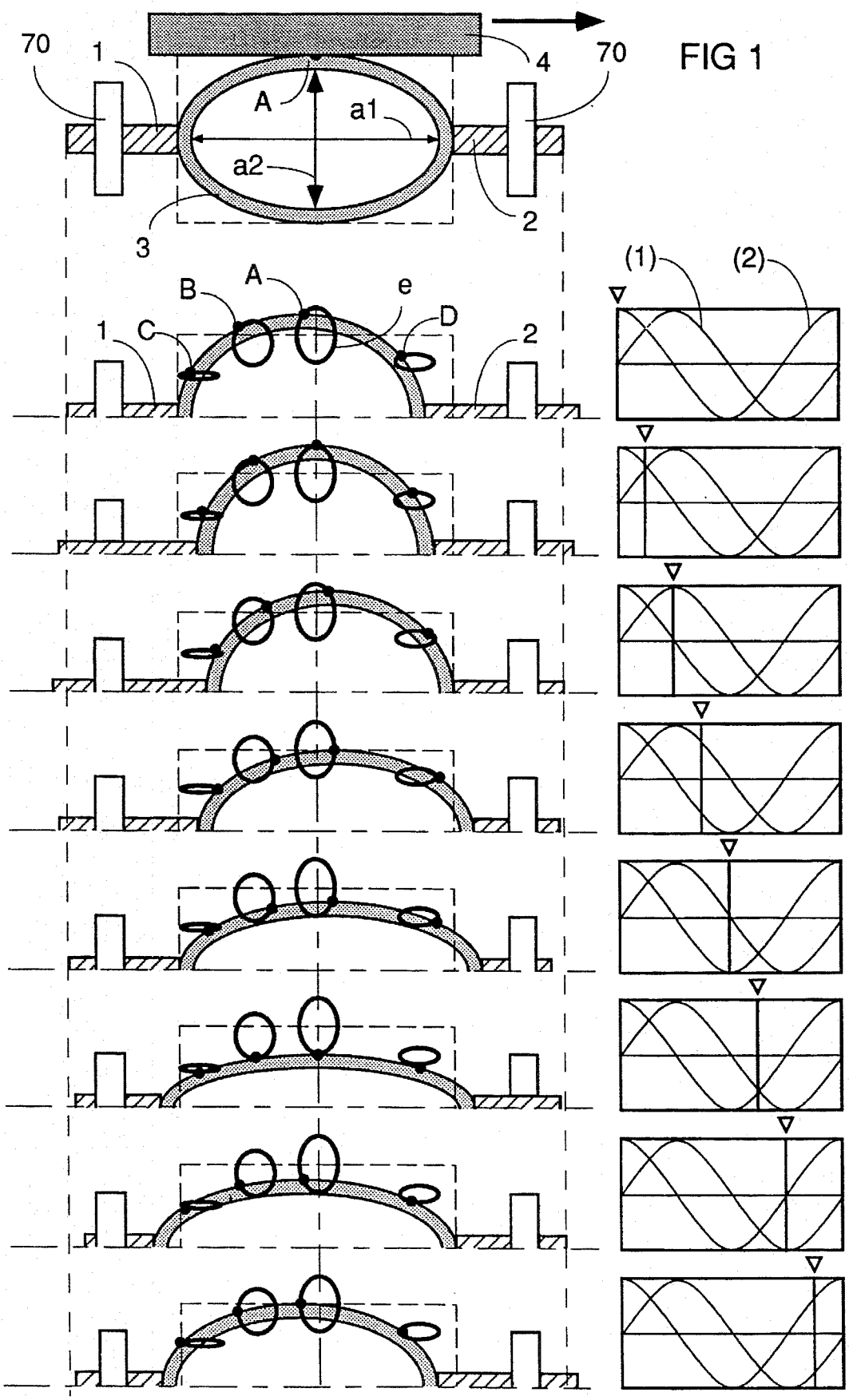
FIG. 1 illustrates the principle of the motor according to the invention and its operation.

The principle for construction of the core of the motor according to the invention is represented diagrammatically in FIG. 1. It is made up of two transducers 1 and 2 located colinearly on each side of a mechanical coupling means. These transducers 1 and 2 are in permanent contact, via one of their ends, with the mechanical coupling means 3 and mounted on a support structure 70 by means of a collar embracing the transducer at a vibration node. The transducers 1 and 2 are designed to generate longitudinal vibrations in the direction of the axis of alignment a. These transducers are of piezoelectric, magnetostriction or electrostriction type. The piezoelectric tranduscers may use known materials, for example sintered PZT ceramics (commercial reference P189), or $BaTiO_3$. If the transducers are of magnetostriction type, magnetostriction materials such as rare earth/iron alloys, and in particular TERFENOL-D will preferably be used.

As recited before the transducers are advantageously LANGEVIN'S transducers but there are other types of transducers offering the advantage of presenting a vibration node common to both vibration modes. They are the longitudinal monolithic vibrations. They are made of a single piezoelectric piece polarized and provided with electrodes. To this category belong the piezoelectric bars excited in modes 33 or 31.

The vibrators may be also of unimorphs or bimorphs type.

The coupling means 3 is made up of an elliptical ring made of elastically deformable material, for example steel or an aluminium alloy. The diametrically opposed ends of this ring 3 are in permanent contact with the transducers 1 and 2 and in general fixed to these transducers. The coupling ring fulfills the triple function of vibration coupling, geometric vibration converter and mechanical amplitude converter. The transducers 1 and 2 are excited at the same frequency, but with a phase shift of $\pi/2$ (90°). FIG. 1 represents, in a highly exaggerated manner, the deformation of the coupling ring 3 by the transducers 1 and 2 during an oscillation. Consider the point A determined by the intersection of the minor radius of the coupling ring 3 with its external contour. As emerges from the various positions represented in FIG. 1, this point A describes an ellipse e upon each oscillation of the transducers. This elliptical trajectory has been described in detail in the documents mentioned earlier. If a body 4 is kept in contact with the coupling 3 at the point A or in the region of this point, it will consequently be driven frictionally to the right in the direction of the arrow. Conversely, if the body 4 is fixed, then it is the transducers/coupling assembly which will be set into movement. The coupling ring 3 therefore transmits the vibrations and provides geometric conversion of these vibrations since from axial vibrations along the axis a, phase-shifted axial and radial vibrations are obtained, generating the ellipse e. If three other points B, C and D are considered on the external contour of the coupling ring, which points are chosen in an arbitrary manner, it is observed that these points, constrained to keep a constant curved distance from one of the ends of the coupling ring, each describes an ellipse of more or less pronounced eccentricity, and that all the points on the external contour of the coupling ring describe this ellipse in the same direction and in phase.

The ability to convert the amplitudes of displacement and the amplitudes of force is an important characteristic of the elliptical, oval, almost elliptical or closed basket-handle shape of the coupling ring. In order to simplify the description, it will be assumed from now on that coupling ring 3 has an elliptical shape. For an elliptical coupling ring compressed along the major axis of the ellipse by displacements of amplitude u, the amplitudes of radial displacement u along its minor axis are amplified fairly substantially in a ratio $\alpha > 1$ approaching the major axis/minor axis ratio a1/a2. In practice, amplification factors of 2 to 5 may be obtained. The forces are, conversely, descreased in the same ratio $\alpha$.

The coupling ring 3 could equally well be excited along the minor axis of the ellipse, but in this case we should get $\alpha < 1$.

It can consequently be seen that the shape of the coupling means makes it possible to perfectly control the displacement amplifier and force amplifier functions. It will furthermore be noted that the amplitude conversion effect comes into play only in producing the radial component of displacement of the point of contact A. Its axial component is, in principle, independent of this effect, and therefore independent of the shape of the coupling ring 3. This point is very important for producing the motor in order to obtain satisfactory operation in resonance, particularly for producing piezoelectric motors. The coupling ring must, in effect, not constitute a vibration damper element which would too greatly reduce the efficiency of such motors and render them unusable. Mounting the transducers at a vibration node allows to reach a higher efficiency.

In order to obtain a coupling ring whose resonance frequency is the same in both vibrating modes, it has been found that the following relation must be met.

$$\alpha = ((m_C/m^*_C) \cdot (2k_A+k_C)/2k_A)^{1/2} \quad (1)$$

where $\alpha$ is approximately the ratio between major and minor axis of the coupling ring, $m_C$ is the motional mass of the ensemble of coupling ring and transducers during their translation motion considered from the transducers, $m^*_C$ is the mass of the ensemble of coupling ring and transducers in flexion mode considered from the transducers, $k_A$ is the stiffness of the transducers, $k_C$ is the stiffness of the coupling ring considered or obtained from the transducers.

The motional mass corresponds to the mass of the parts in movement. When the coupling ring is moving in translation this mass is equal to the entire mass of the ring plus the additional motional mass of the transducers. When the coupling ring is moving in flexion the motional mass is only equal to the moving masses. $m^*_C$ may be much smaller than $m_C$.

It appears in the relation (1) that the terms $m_C/m^*_C$ on one hand and $(2k_A+k_C)/2k_A$ on the other hand are both greater than 1 so that $\alpha$ is also greater than 1. This means that the transducers must be located on the major axis of the ellipse.

In other respects a very elongated shape of the coupling ring giving $\alpha$ much greater than 1 presents a low stiffness in the direction of application of the force of contact which is necessary to drive the body 4, particularly a rotor, and is limiting this force and the efficiency of the motor. Elliptic shapes with $\alpha$ near 1 are then preferable.

It is possible to do that the value of $\alpha$ tends toward 1 by providing the coupling ring with additional masses $m_1$ in the zone of the point A and at a point which is symmetric with the latter. $\alpha$ tends toward 1, the shape of the coupling ring tends toward a circle and its stiffness increases in the direction of the application of the force of contact. This force can be higher. In this case the relation (1) becomes $$\alpha = ((m_C+m1)/(m^*_C+m1) \cdot (2k_A+k_C)/2k_A)^{1/2} \quad (2)$$

In order to increase the force of contact of the coupling ring with the driven body other measures are possible. For example it is possible to use a coupling ring with non uniform section, this section being greater in the zone of contact with the transducers and decreasing toward the point A and its symmetric point.

Some embodiments will be described hereafter.

Figure 2:
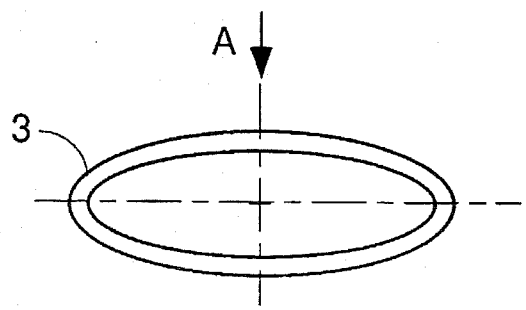
FIG. 2 represents a first annular coupling embodiment.
Figure 3:
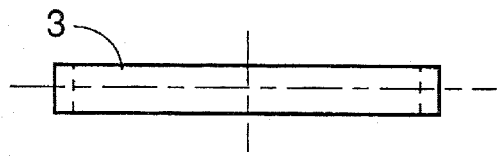
FIG. 3 is a view on A of the coupling of FIG. 2.

FIGS. 2 and 3 represent a coupling ring the external and internal surfaces of which being cylindrical surfaces.

Figure 4:
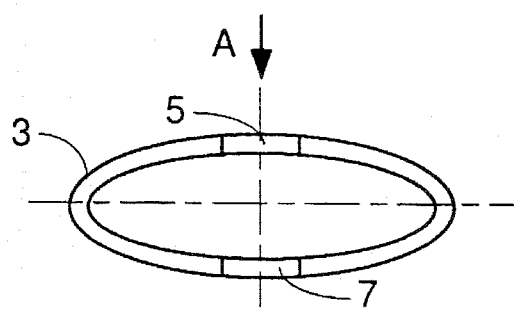
FIG. 4 represents a second annular coupling embodiment.
Figure 5:
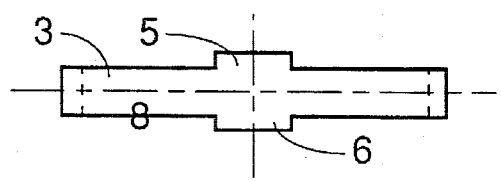
FIG. 5 represents a view on A of the coupling of FIG. 4.
Figure 6:
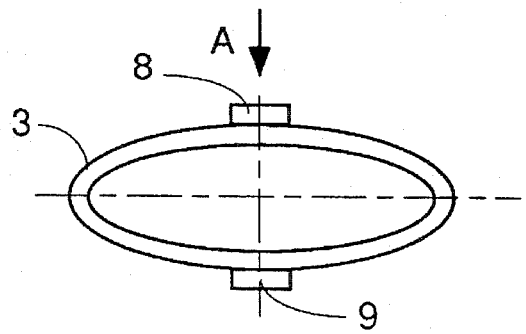
FIG. 6 represents a third annular coupling embodiment.
Figure 7:
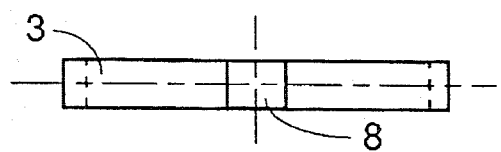
FIG. 7 is a view on A of the coupling of FIG. 6.

In the example represented in FIGS. 4 and 5, additional masses are formed by lateral projections 5, 6, 7. In the embodiment according to FIGS. 6 and 7, additional masses are formed by radial projections 8 and 9.

Figure 8:
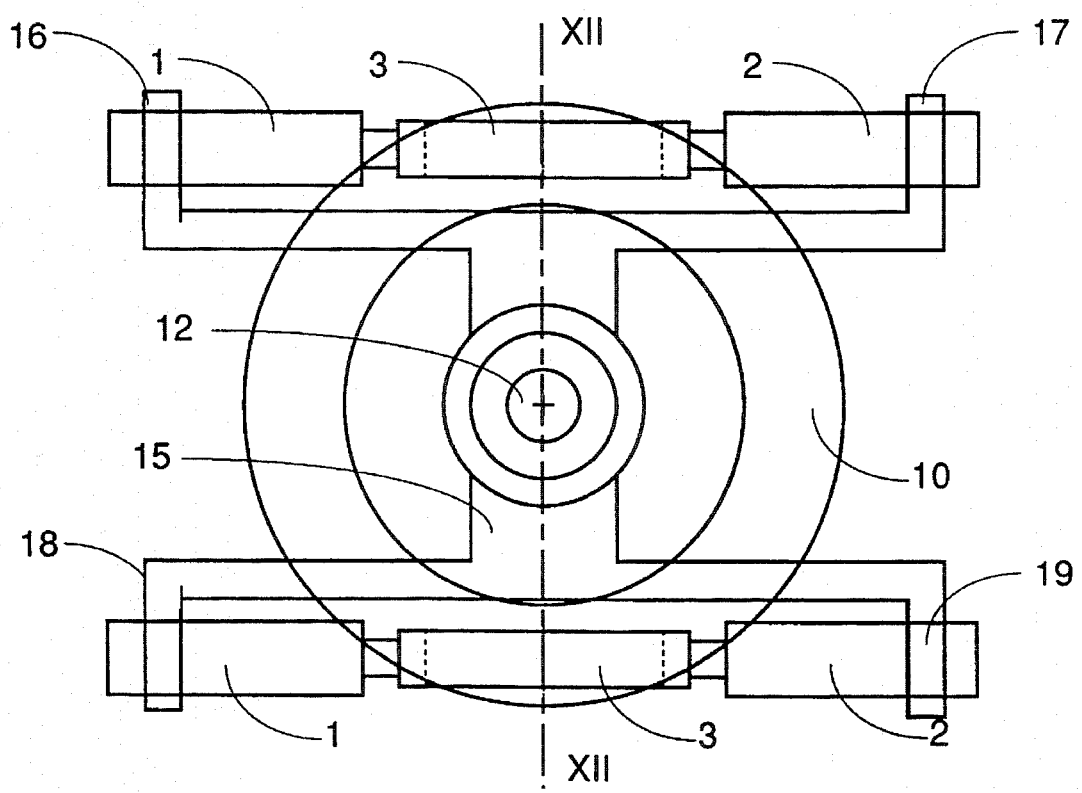
FIG. 8 is a diagrammatic axial view of a motor with two rotors and two drive devices.
Figure 9:
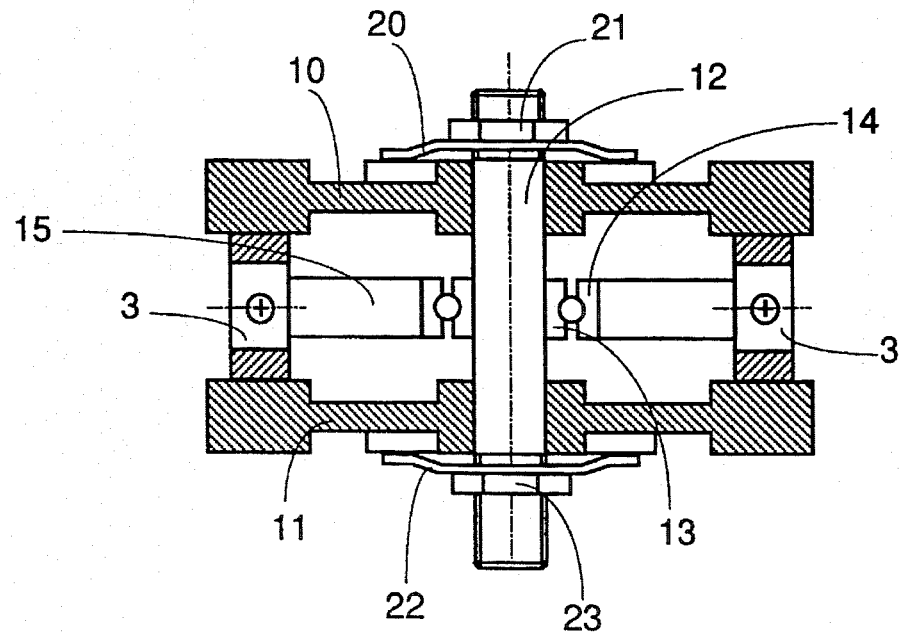
FIG. 9 is an axial section on XII—XII of the motor of FIG. 8.

One motor example will now be described in relation to FIGS. 8 and 9. This motor comprises two rotors 10 and 11 in the form of a disk which are rotationally secured to a shaft 12 but free to move axially on this shaft, onto which is driven the internal race 13 of a ballbearing, the external race 14 of which is fixed into a support structure 15 extending in a plane perpendicular to the shaft 12. This support structure 15, in the form of an H in this example, furthermore has two pairs of arms 16, 17 and 18, 19. Between the arms 16 and 17 is mounted a first driver device produced according to the diagram represented in FIG. 1 with a coupling ring 3 as represented in FIGS. 2 and 3. The coupling ring 3 is fixed by any appropriate means to the transducers, for example by screwing or bonding. For reasons of simplification of the manufacture, the elliptical shape of the coupling ring 3 may effectively be approximated by a basket-handle shape, that is to say a curve defined solely by two radii of curvature. Between the other two arms 18 and 19, symmetrically to the first drive device and relative to the shaft 12, is mounted a second drive device identical to the first. The rotor is a furthermore axially retained by a spring 20 kept under tension by a nut 21. Likewise, the rotor 11 is subject to the action of a spring 22 kept under tension by a nut 23. The rotors 10 and 11 are thus elastically kept with a certain pressure against the coupling ring 3, which are therefore prestressed. The coupling ring 3, diametrically opposed relative to the shaft 12, thus act on each of the rotors 10 and 11 at two points which are diametrically opposed relative to the minor axis of each of the couplings. The assembly formed by the support structure 15 with its drive devices constitutes the stator of the motor.

According to the same principle, it is possible to produce a motor with three stators or more distributed on a regular polygone about the shaft 12.

If the stators are excited in phase, this results in a vibration of the rotors 10 and 11 along the axis of the shaft 12. If several stators are available, this vibration may be almost eliminated by introducing a mechanical phase shift between each stator, so that the rotors are held up at an almost constant height, which makes it possible to eliminate impacts between the stators and the rotors and which leads to an increase in durability. This mechanical phase shift may already be introduced in a motor with two stators as represented.

The rotors could be spoked wheels driven by their rim.

On the basis of the principle of the motor of FIG. 1, it is possible to construct linear motors. Examples of such motors are represented in FIGS. 10 to 18.

FIG. 10 represents a carriage comprising a bar 24 crossing axially two transducers 1 and 2 and a coupling ring 3 disposed between the transducers 1 and 2 and driven by said transducers. The bar 24 is suspended from a rail 25 by a pair of rollers 26 and 27 mounted in clevises 28 and 29 to which are fixed suspension bars 30 and 31 equipped with a head 34, 35 and crossing the transducers 1 and 2 and the collars 70 embracing each transducer. Belleville washers 32 and 33, located between the heads 34, respectively 35 of the suspension bars 30 and 31 and the collars 70, provide prestresse of the coupling ring 3 thus kept in contact with the lower face of the rail 25. Depending on the direction of the phase shift of the excitation of the transducers 1 and 2, the carriage travels to the left or to the right. As in the case of a rotary motor, it is possible to multiply the number of drive devices. Likewise, it is possible to introduce mechanical phase shifts between each drive device in order to eliminate the vibrations of the carriage.

According to a variant embodiment which is not represented but can easily be envisaged, the carriage may exhibit symmetry relative to the rail, that is to say couplings acting on both sides of the rail, which makes it possible to eliminate the rollers.

Figure 11:
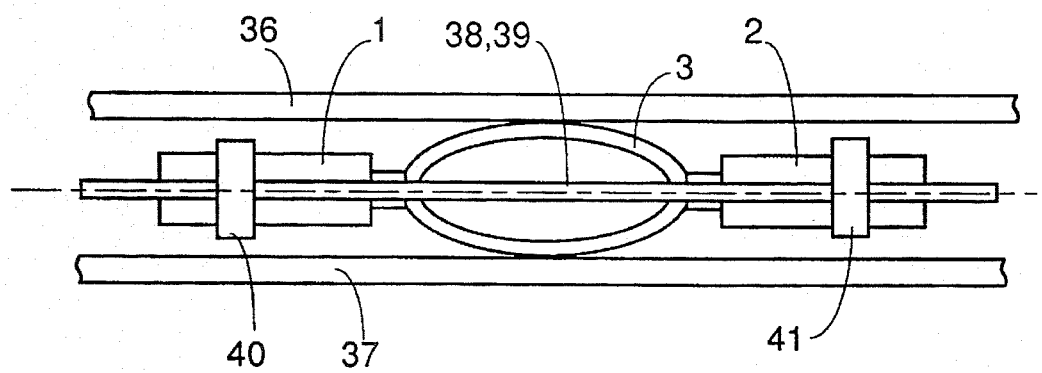
FIG. 11 represents a linear motor with two symmetric rails.

FIG. 11 represents a linear motor with two parallel rails 36, 37 between which is mounted a motor device of the type represented in FIG. 1. The assembly is axially prestressed in a frame formed by a pair of parallel bars 38, 39 passing through yokes 40 and 41, by means of springs 42, 43 made up in the form of Belleville washers compressed between a nut 44, respectively 45 and each of the yokes 40, 41.

A variant using a single central bar is represented on FIG. 21. As shown the single bar 71 crosses the coupling shell 3 and the transducers 1 and 2. The bar 71 is threaded as each end and provided with nuts 72 and 73 which simultaneously maintain the transducers 1 and 2 applied against the shell 3 and prestress the shell against the rails 36 and 37. The transducers 1 and 2 are equipped with collars 74 and 75 similar to the collars 70, for assembling the motor to an equipment to be driven by the motor.

The structure could also be axisymmetrical using a shell of ovoid shape (FIGS. 18, 19, 20) and a tube instead of rails.

Figure 12:
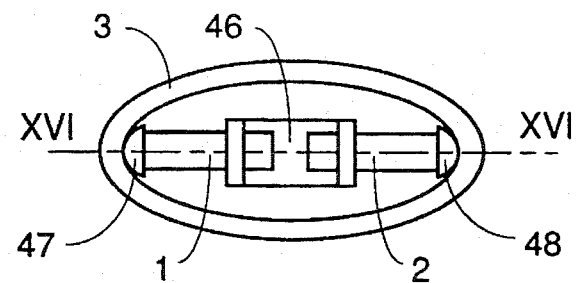
FIG. 12 represents a motor with annular coupling and internal transducers.
Figure 13:
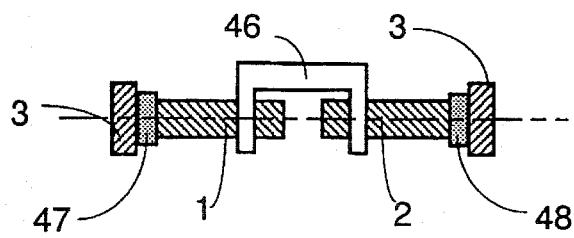
FIG. 13 is a section on XVI—XVI of FIG. 12.

Hitherto, structures in which the transducers were situated on the outside of the coupling ring 3 were always considered. It is, however, possible to use the space available inside the coupling ring 3 in order to locate the transducers therein. This embodiment is represented in FIGS. 12 and 13. The coupling ring 3 is again of elliptical or almost elliptical annular shape. The transducers 1 and 2 are located inside the ring, along the major axis of the ellipse. They are borne by a median support 46. The transducers 1 and 2 are fitted with shaped heads 47 and 48 matching the internal curvature of the ellipse.

Figure 14:
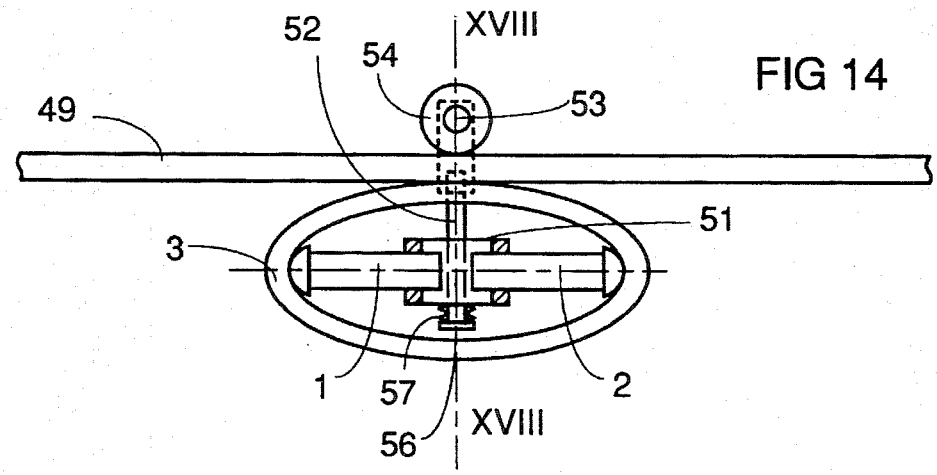
FIG. 14 represents a carriage with linear motor using the structure represented in FIGS. 12 and 13.
Figure 15:
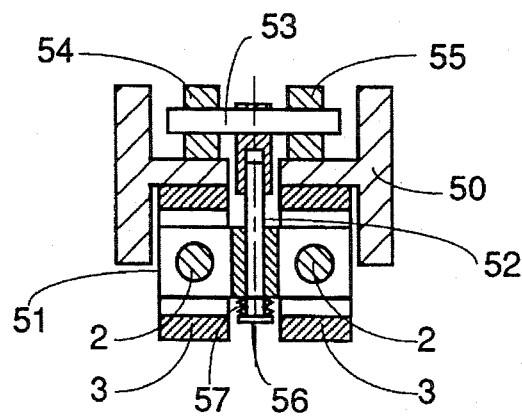
FIG. 15 is a section on XVIII—XVIII of FIG. 14.

FIGS. 14 and 15 represent a linear motor example produced according to the design represented in FIGS. 12 and 13. This linear motor comprises a pair of parallel rails 49, 50 from which a support structure 51 is suspended by a central suspension bar 52 attached to a rod 53 bearing two rollers 54 and 55 running respectively on the rails 49 and 50. The lower end of the suspension bar 52 is fitted with a head 56, elastic prestress washers 57 being compressed between this head 56 and the support structure 51. The support structure 51 bears two drive structures such as represented in FIGS. 12 and 13, these structures being located in parallel and their coupling ring 3 interacting respectively with each of the rails 49 and 50. As in the preceding examples, it is possible to use several drive elements, preferably mechanically phase-shifted and/or a structure which is symmetric relative to the rails 49 and 50.

FIGS. 16 and 17 represent a motor with an internal location of the transducers 1' and 2', fixed to a support structure 66 in the shape of a H entirely located inside the coupling rings 3. The transducers 1' and 2' are also situated inside the couplings which are here compressed along their major axis. This structure is particularly compact and able to be mounted in a winding tube so that it is directly rotationally driven by the rotors 62 and 63.

As recited before the coupling shell may have a flat structure (ring) or a three-dimensional structure. FIGS. 18, 19, 20 represent a shell having a shape like an ellipsoid. This shell may equally well fitted with add masses in the form of a ring or segments of ring. The relations (1) and (2) are also applicable to such a three-dimensional shell.

By comparison with existing motors, motors according to the invention, for example of the piezoelectric type, allow very simple motors to be produced and allow complicated speed reduction gear to be dispensed with.

We claim:

1. An electric motor comprising at least one pair of transducers each comprising a vibrating element, these transducers being located colinearly in permanent contact with a support structure and excited so that their vibrating elements vibrate at one and the same frequency, depending on the alignment of the transducers, but with a phase shift of 90°, an elastic coupling shell presenting an axis of symmetry on which the transducers are aligned and able to produce, from symmetrical displacements due to the transducers, displacements on points of the shell belonging to the symmetry plane perpendicular to the axis of symmetry, both perpendicular to the previous one and amplified by a factor $\alpha$ and at least one element frictionally driven by the coupling shell whose zone of contact with the driven element is given a circular elliptical movement, wherein said transducers are supported at a vibration node by said support structure and wherein the motional mass $m_C$ of the ensemble of coupling shell and transducers in translation motion, the motional mass $m^*_C$ of the ensemble of coupling shell and transducers in flexion mode, the stiffness $k_A$ of the transducers from the transducers and the stiffness $k_C$ of the coupling shell considered from the transducers meet at least approximately the relation $\alpha=((m_C/m^*_C).(2k_A+k_C)/2k_A)^{1/2}$, in order to match the flexion mode and the translation mode.

2. The rotary motor as claimed in claim 1, wherein it comprises two rotors in the form of a disk or of spoked wheels, which are parallel and coaxial, between which are mounted at least two coupling shells with their transducers, the shells being prestressed between the rotors.

3. The linear motor as claimed in claim 1, wherein the shell is mounted on a carriage suspended from a rail and fitted with elastic means applying the shell against the rail.

4. The linear motor as claimed in claim 1, wherein it comprises a pair of opposed shells with their transducers, mounted on a carriage and a rail gripped between the shells.

5. The linear motor as claimed in claim 1, wherein the shell and its transducers are mounted between two parallel rails in a frame comprising a means for prestressing the shell in the direction of the transducers, so as to apply the shell against the two rails.

6. The linear motor as claimed in claim 1, wherein the shell is mounted, between its two transducers, on a bar crossing axially the transducers and the shell.

7. The linear motor as claimed in claim 6, wherein the coupling shell is mounted between two parallel rails, the ends of the bar being threaded and equipped with nuts maintaining the transducers applied against the shell and exerting a prestress on the shell pressed against the rails.

8. The motor as claimed in claim 1, wherein the coupling shell is fitted with additional masses, m1 and the relation $\alpha=((m_C+m1)/m^*_C+m1).(2k_A+k_C)/2k_A)^{1/2}$ is at least approximately met.

9. The motor as claimed in claim 1, wherein the transducers are situated outside the coupling shells.

10. The motor as claimed in claim 1, wherein the coupling shells consist of rings and the transducers are situated inside the coupling rings.

11. The motor as claimed in claim 1, wherein the transducers are of piezoelectric type.

12. The motor as claimed in claim 1, wherein the transducers are magnetostriction transducers.

13. The motor as claimed in claim 10, wherein the magnetostriction material is a rare earth/iron alloy, particularly TERFENOL-D.

14. The motor as claimed in claims 1 or 2, including at least two stators each one made up of a coupling ring and of a pair of transducers and having a common support structure, wherein the stators are powered with a phase shift such that the rotor, respectively the rotors, remain at an almost constant height.

15. The motor as claimed in claim 14, including several stators whose coupling shells are located on a regular polygone about the axis of the motor, wherein the stators are powered with a phase shift between two consecutive stators.

* * * * *